J. J. WESCOTT.
VEHICLE CONNECTION.
APPLICATION FILED OCT. 9, 1907.

930,636.

Patented Aug. 10, 1909.

Witnesses

Inventor
John J. Wescott

By
Attorneys

UNITED STATES PATENT OFFICE.

JOHN J. WESCOTT, OF MONROE, WISCONSIN.

VEHICLE CONNECTION.

No. 930,636.　　　　Specification of Letters Patent.　　　Patented Aug. 10, 1909.

Application filed October 9, 1907. Serial No. 396,692.

*To all whom it may concern:*

Be it known that I, JOHN J. WESCOTT, a citizen of the United States, residing at Monroe, in the county of Green and State of Wisconsin, have invented certain new and useful Improvements in Vehicle Connections, of which the following is a specification.

This invention comprehends certain new and useful improvements in yielding or resilient bearing connections between the body portion and running gear of vehicles, and the invention has for its object an improved device of this character which is arranged to absorb lateral as well as vertical shocks; which embodies to a marked degree the characteristics of simplicity, durability and efficiency in construction and operation, and which consists of comparatively few parts that are susceptible of being conveniently separated when desired.

With these and other objects in view the invention consists in certain constructions and arrangements of parts that I shall hereinafter fully describe and then point out the novel features in the appended claim.

Figure 1:
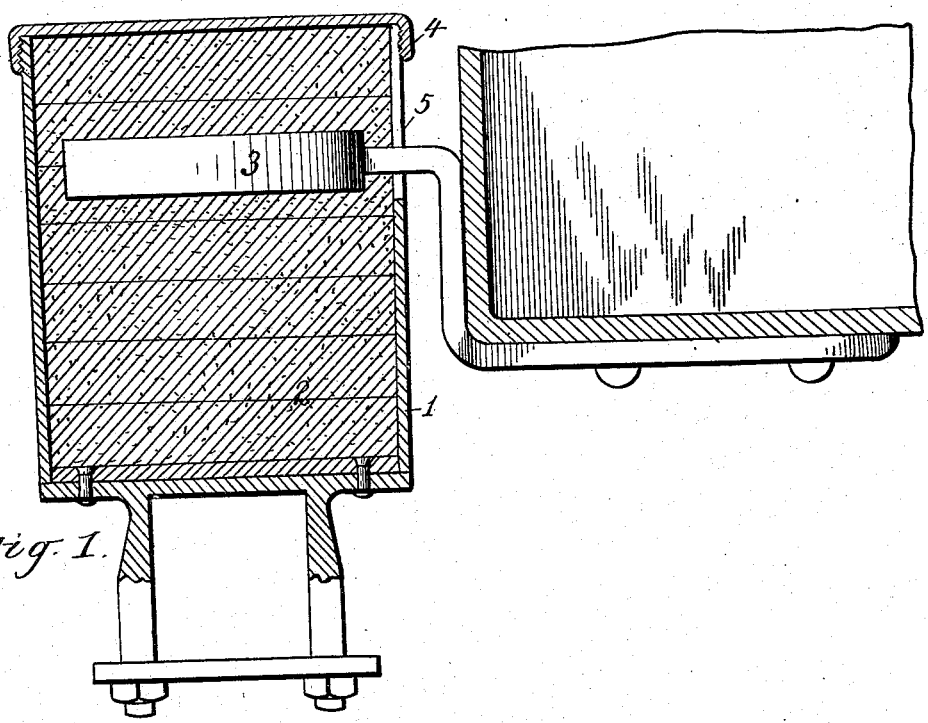
Figure 2:
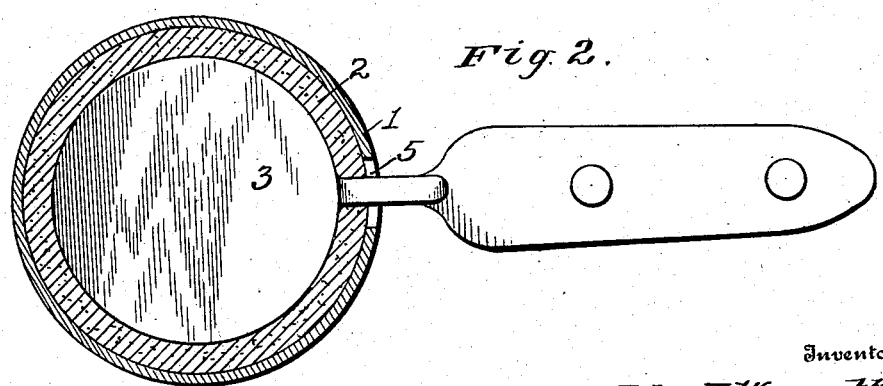

For a full understanding of the invention, reference is to be had to the following description and accompanying drawings, in which:

Figure 1 is a vertical section showing the improved vehicle connection attached. Fig. 2 is a plan view with the detachable portion removed.

Corresponding and like parts are referred to in the following description and indicated in all the views of the drawings by the same reference characters.

In carrying out my invention, I provide a cup-like box or case 1 that may be of any size or shape found most suitable for the type of vehicle upon which it is to be used, and that is preferably constructed of metal and is provided with suitable means whereby it may be rigidly attached to the running gear of the vehicle. This case is formed in one side with a preferably elongated slot or opening 5 through which passes a supporting arm that is rigidly secured at one end to the body portion of the vehicle, and that is formed at its other end within the case 1 with a head 3, said head being arranged to be centrally embedded in a cushion 2 that is provided within the case. In the present instance, the head 3 is formed upon the body loop of the vehicle, which thus constitutes the supporting arm and is arranged to work back and forth in the slot or opening 5 to permit the head to vibrate within the case, the latter being preferably formed with a detachable top section 4 to render the parts capable of being conveniently assembled or separated according as desired.

The cushion 2 may be of solid or pneumatic rubber or any other resilient material or substance or a combination of resilient and solid substances and should substantially fill the case 1 so as to entirely surround the head 3 of the body loop and absorb lateral as well as vertical shocks and prevent the same from being transmitted to the body.

From the foregoing description it will be seen that I have provided a vehicle connection which is thoroughly efficient as a shock-arrester or absorber and which may be cheaply manufactured for use on all types of vehicles.

It is to be understood that in cases where it would be more convenient the box or case 1 is to be fastened to the body portion of the vehicle and the head 3 formed on or attached to the running gear.

Having thus described the invention, what I claim is:

The combination with the body portion and running gear of a vehicle, of a resilient connection interposed therebetween, said connection comprising a case open at one end and formed in its side with a slot leading longitudinally from said end of the case, the case being secured to one part of the vehicle, a supporting arm secured to the other part and passing through said slot and formed in the interior of the case with a laterally enlarged head, a cushion substantially filling the case and surrounding the head, and a closure removably secured to said open end of the case and closing the adjacent end of the slot.

In testimony whereof I affix my signature in presence of two witnesses.

JOHN J. WESCOTT. [L. S.]

Witnesses:
M. B. WESCOTT,
C. W. TWINING.